United States Patent
Jeon et al.

(10) Patent No.: US 8,440,368 B2
(45) Date of Patent: May 14, 2013

(54) STAINLESS STEEL SEPARATOR FOR FUEL CELL HAVING M/MN$_x$ AND MO$_y$N$_z$ LAYER AND METHOD FOR MANUFACTURING THE SAME

(75) Inventors: Yoo Taek Jeon, Gyeonggi-do (KR); Kyeong Woo Chung, Seoul (KR); Hyun Sik Myung, Gyeonggi-do (KR); Yong Sik Yun, Gyeonggi-do (KR); Jong In Park, Gyeonggi-do (KR); Eun Young Kim, Gyeonggi-do (KR)

(73) Assignee: Hyundai Hysco, Ulsan (KR)

( * ) Notice: Subject to any disclaimer, the term of this patent is extended or adjusted under 35 U.S.C. 154(b) by 262 days.

(21) Appl. No.: 12/624,256

(22) Filed: Nov. 23, 2009

(65) Prior Publication Data

US 2011/0065024 A1  Mar. 17, 2011

Related U.S. Application Data

(63) Continuation of application No. PCT/KR2008/000508, filed on Jan. 28, 2008.

(30) Foreign Application Priority Data

Jun. 20, 2007 (KR) .................. 10-2007-0060634

(51) Int. Cl.
  *H01M 4/66* (2006.01)
  *C23C 14/00* (2006.01)
(52) U.S. Cl.
  USPC .................... 429/522; 204/192.15

(58) Field of Classification Search .......... 429/400–535, 429/517–522; 204/192.15
See application file for complete search history.

(56) References Cited

U.S. PATENT DOCUMENTS

| | | | |
|---|---|---|---|
| 6,025,094 A | 2/2000 | Visco et al. | |
| 6,617,057 B2 * | 9/2003 | Gorokhovsky et al. | 428/698 |
| 6,696,194 B1 | 2/2004 | Hori et al. | |
| 7,005,205 B1 | 2/2006 | Gyoten et al. | |
| 7,052,794 B2 | 5/2006 | Nakata et al. | |

(Continued)

FOREIGN PATENT DOCUMENTS

| | | |
|---|---|---|
| JP | 2005-78956 | 3/2005 |
| JP | 2007-012526 | 1/2007 |
| WO | WO 2005124910 A1 * | 12/2005 |

OTHER PUBLICATIONS

A.D. Verkhoturov, et al., Electrochemical Behavior of Transition Metals & Refractory Compounds of Titanium in Synthetic Sea Water, Institute of Mining of the Far East Scientific Center, Academy of Sciences of the USSR, No. 2 (302), pp. 81-87, Feb. 1988.

(Continued)

*Primary Examiner* — Basia Ridley
*Assistant Examiner* — Jonathan G Leong
(74) *Attorney, Agent, or Firm* — Lowe Hauptman Ham & Berner, LLP

(57) ABSTRACT

Disclosed herein is a stainless steel separator for a fuel cell and method of manufacture. The stainless steel separator includes a stainless steel sheet, a first coating layer comprising metal/metal nitride films (M/MN$_x$) ($0.5 \leq x \leq 1$) on a surface of the stainless steel sheet, and a second coating layer comprising a metal oxynitride film (MO$_y$N$_z$) ($0.05 \leq y \leq 2$, $0.25 \leq z \leq 1.0$).

15 Claims, 7 Drawing Sheets

U.S. PATENT DOCUMENTS

| | | | |
|---|---|---|---|
| 2005/0238873 | A1 | 10/2005 | Brady et al. |
| 2006/0110648 | A1* | 5/2006 | Lee et al. ............... 429/38 |
| 2006/0216570 | A1 | 9/2006 | Vyas et al. |
| 2007/0092780 | A1* | 4/2007 | Vyas et al. ............. 429/34 |
| 2007/0099012 | A1 | 5/2007 | Brady et al. |
| 2008/0050635 | A1* | 2/2008 | Gao et al. ............... 429/34 |

OTHER PUBLICATIONS

I. Milosev, et al., Electrochemical and Thermal Oxidation of TiN Coatings Studied by XPS, Surface & Interface Analysis, vol. 23, pp. 529-539 (1995).

Naresh C. Saha, et al., Titanium Nitride Oxidation Chemistry: An Xray Photoelectron Spectroscopy Study, AIP Journal of Applied Physics, 72, 3072 (1992).

I. Milosev, et al., A Corrosion Study of TiN (Physical Vapour Deposition) Hard Coatings Deposited on Various Substrates, Surface and Coatings Technology, 63 (1994) 173-180.

Y. Massiani, et al., Electrochemical Study of Titanium Nitride Films Obtained by Reactive Sputtering, Thin Solid Films, 191 (1990) 305-316.

C. Ernsberger, et al., Low Temperature Oxidation Behavior of Reactively Sputtered TiN by X-Ray Photoelectron Spectroscopy & Contact Resistance Measurements, J. Vac. Sci. Technol. A 4 (6) Nov./Dec. 1986.

M.P. Brady, et al., The Formation of Protective Nitride Surfaces for PEM Fuel Cell Metallic Bipolar Plates, JOM, Aug. 2006.

K.K. Shin et al; "Ti/Ti-N. Hf/Hf-N. and W/W-N multilayer films with high mechanical hardness"; Appl. Phys. Lett. 61, 654 (1992); http://dx.doi.org/10.1063/1.107812; IBM Research Division, Thomas J. Watson Research Center, Yorktown Heights, New York; 2 pages.

* cited by examiner

STAINLESS STEEL SEPARATOR FOR FUEL CELL HAVING M/MN$_x$ AND MO$_y$N$_z$ LAYER AND METHOD FOR MANUFACTURING THE SAME

This application is a continuation of Korean PCT Application No. PCT/KR2008/000508 filed on Jan. 28, 2008 which designates the United States of America.

TECHNICAL FIELD

The present invention relates to a stainless steel separator for fuel cells and a method for manufacturing the same, and more particularly to a stainless steel separator for fuel cells having metal/metal nitride layers and a metal oxynitride layer, and a method for manufacturing the same.

BACKGROUND ART

A separator is an essential component for fuel cells along with a membrane electrode assembly (MEA) and performs various functions, such as structural support for the MEA and gas diffusion layers (GDLs), collection and transmission of current, transmission and removal of reaction gas and reaction product, transmission of water coolant used for removing reaction heat, and the like.

Hence, it is necessary for separator materials to have excellent electrical and thermal conductivity, air-tightness, chemical stability, and the like.

Generally, graphite-based materials and composite graphite materials consisting of a resin and graphite mixture are employed as the separator material.

However, graphite-based materials exhibit lower strength and air-tightness than metallic materials, and suffer from higher manufacturing costs and lower productivity when applied to manufacture of separators. Recently, metallic separators have been actively investigated to overcome such problems of the graphite-base separator.

When the separator is made of a metallic material, there are many advantages in that volume and weight reduction of fuel cell stacks can be accomplished via thickness reduction of the separator, and in that the separator can be produced by stamping and the like, which facilitates mass production of the separators.

In this case, however, the metallic material is likely to undergo corrosion during the use of the fuel cell, causing contamination of the MEA and performance deterioration of the fuel cell stacks, and a thick oxide film can form on the surface of the metallic material by extended use of the fuel cells, causing an increase in internal resistance of the fuel cell.

Stainless steel, titanium alloys, aluminum alloys, nickel alloys, and the like are proposed as candidate materials for the separator of the fuel cell. Among these materials, stainless steel has received attentions for its lower price and good corrosion resistance, but further improvements in corrosion resistance and electrical conductivity are still needed.

Referring to FIG. 1, Japanese Patent Laid-open Publication No. 2003-277133 discloses a technique that distributes relatively inexpensive carbon powder 3 in a passive film 2 on a metallic separator to improve electrical conductivity of the metallic separator.

However, when applying such fuel cells of the disclosure to a vehicle, the carbon powders 3 tend to be separated due to vibration and the like generated when driving the vehicle, and, stainless steel 1 of the metallic separator exhibits a high contact resistance without proper pretreatment, making it difficult to use the metallic separator for the fuel cell.

Referring to FIG. 2, Japanese Patent Laid-open Publication No. 2000-353531 discloses a technique that forms a titanium nitride film 2 on stainless steel 1 through high temperature nitridation of titanium.

However, since this process requires a long period of treatment and must be performed under vacuum, it has difficulty in constitution of a process for mass production and suffers from high manufacturing costs.

DISCLOSURE

Technical Problem

The present invention is conceived in view of the above problems of the conventional techniques, and an aspect of the present invention is to provide a stainless steel separator for fuel cells having excellent electrical conductivity and corrosion resistance.

Another aspect of the present invention is to provide a method of manufacturing such a stainless steel separator.

Technical Solution

In accordance with one embodiment of the present invention, the above and other aspects can be accomplished by the provision of a stainless steel separator for a fuel cell including a stainless steel sheet; a first coating layer comprising metal/metal nitride films (M/MN$_x$) ($0.5 \leq x \leq 1$) on a surface of the stainless steel sheet; and a second coating layer comprising a metal oxynitride film (MO$_y$N$_z$) ($0.05 \leq y \leq 2$, $0.25 \leq z \leq 1.0$).

In accordance with another embodiment of the present invention, a method of manufacturing a stainless steel separator for a fuel cell comprises: performing sputtering with a metal target in an argon atmosphere to form a metal film of a first coating layer; performing sputtering in a combined argon-nitrogen atmosphere to form a metal nitride film of the first coating layer (when forming the first coating layer comprising multiple metal/metal nitride films (M/MN$_x$), repeating the sputtering while alternating between the argon atmosphere and the combined argon-nitrogen atmosphere); and performing sputtering in a combined nitrogen-oxygen atmosphere to form a second coating layer comprising a metal oxynitride film (MO$_y$N$_z$) on the first coating layer.

In accordance with a further embodiment of the present invention, a method of manufacturing a stainless steel separator for a fuel cell comprises: performing sputtering with a metal target in an argon atmosphere to form a metal layer (M) of a first coating layer; performing sputtering in a combined argon-nitrogen atmosphere to form a metal nitride film (MN) of the first coating layer (when forming the first coating layer comprising multiple metal/metal nitride films (M/MN), repeating the sputtering while alternating between the argon atmosphere and the combined argon-nitrogen atmosphere); and heat treating the stainless steel sheet having the first coating layer comprising the metal/metal nitride films (M/MN) in an oxygen atmosphere to form a second coating layer via thermal oxidation or plasma oxidation for transforming a portion of the outermost metal nitride film into a metal oxynitride film (MO$_y$N$_z$).

Advantageous Effects

A stainless steel separator according to the present invention exhibits excellent corrosion resistance, electrical conductivity, and contact characteristics with respect to a gas diffusion layer (GDL).

Additionally, the surface coating method for the stainless steel separator according to the invention prevents elution of metal ions during the use of the stainless steel separator, thereby suppressing contamination of electrolyte films and electrodes and thus ensuring excellent long-term performance of the fuel cell.

Further, the surface coating method for the stainless steel separator according to the invention suppresses oxide generation, which can cause high electrical resistance of the fuel cell, on a coating layer during the use of the stainless steel separator, thereby suppressing an increase in internal resistance of the fuel cell and thus ensuring excellent long-term performance of the fuel cell.

BEST MODE

Figure 1:
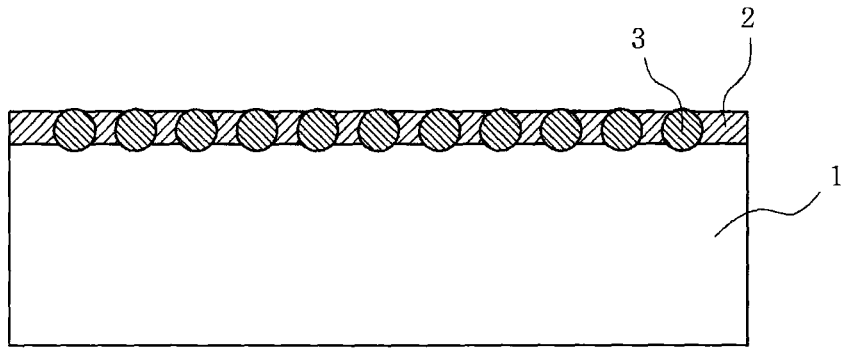
FIG. 1 is a view of a conventional metallic separator including a passive film and conductive powder.
Figure 2:
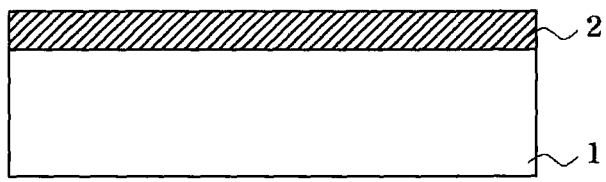
FIG. 2 is a view of another conventional metallic separator having a titanium nitride film formed on the surface thereof.
Figure 3:
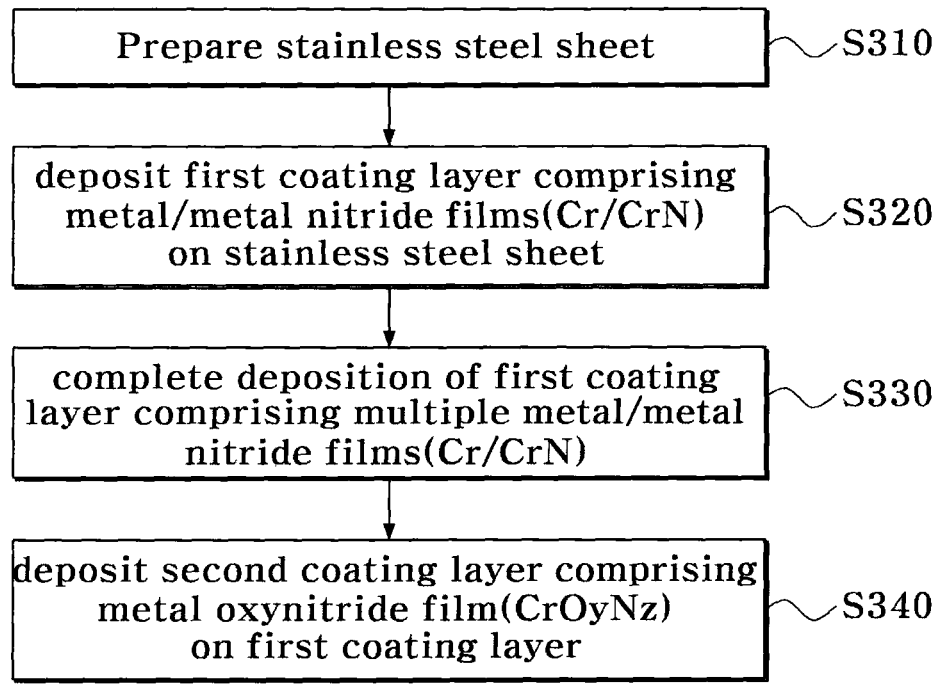
FIG. 3 is a flow diagram illustrating a method of manufacturing a stainless steel separator according to one embodiment of the present invention.

FIG. 3 is a flow diagram illustrating a method of manufacturing a stainless steel separator according to one embodiment of the present invention, and FIGS. 4 to 7 are cross-sectional views of the stainless steel separator at respective steps shown in FIG. 3.

Figure 4:
FIGS. 4 to 7 are cross-sectional views of the stainless steel separator at respective steps shown in FIG. 3.

In order to manufacture a stainless steel separator according to one embodiment of the present invention, a stainless steel sheet is first prepared as shown in FIG. 4 (S310).

In this embodiment, the stainless steel sheet 400 is an austenite stainless steel, such as SUS 316L 0.2t, and the like, which is readily available in the marketplace.

Although the stainless steel sheet 400 is shown as having no film on the surface thereof in FIG. 4, the stainless steel sheet 400 may have a passive film on its surface. Alternatively, the passive film may be completely removed from the surface of the stainless steel sheet 400 by etching, or Fe and Ni components may be selectively removed from the passive film by etching.

Further, the surface of the stainless steel sheet 400 may be imparted with a predetermined roughness in consideration of coupling force with respect to a subsequent coating layer.

This operation is performed for the purpose of ensuring proper subsequent coating, and may comprise removing impurities from the surface of the stainless steel sheet 400 by means of acid or alkaline degreasers.

Figure 5:
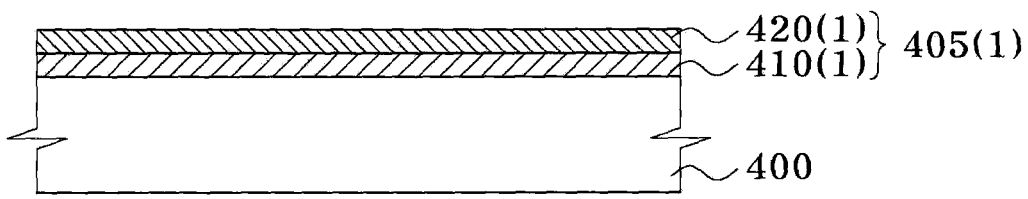

Then, as shown in FIG. 5, a first coating layer 405(1) is formed on the surface of the stainless steel sheet (S320).

The first coating layer 405(1) comprises a metal film (M) 410(1) and a metal nitride film (MN$_x$) 420(1). Here, impurities are inevitably added to the first coating layer during the process of forming the first coating layer.

Metal film (M) of the first coating layer 405(1) can be selected from transition metals having excellent electrical conductivity and corrosion resistance, and preferably from Cr, Ti, and Zr.

The first coating layer 405(1) can be formed by physical vapor deposition such as sputtering or arc ion plating, but the present invention is not limited to these processes.

In this embodiment, Cr is used as the metal for the first coating layer 405(1), and a reactive sputtering process is employed to form the first coating layer 405(1) in order to ensure excellent physical properties of the coating surface and easy control of the process.

In this regard, it should be noted that other transition metals can be used as the metal for the first coating layer 405(1) instead of Cr, and that other processes can be used instead of sputtering.

Referring again to FIG. 5, Cr is used as a sputtering target for forming the first coating layer 405(1).

The Cr target is preferably a high purity target formed of 99.999% or higher purity Cr.

To form the first coating layer 405(1), with the stainless steel sheet 400 and the Cr target loaded in a sputtering chamber, sputtering is performed in an argon atmosphere to form a chrome film (corresponding to 410(1) in FIG. 5) on the surface of the stainless steel sheet 400.

The chrome film 410(1) may have a thickness in the range of 5~500 nm.

Next, as a continuous process, a chrome nitride film (CrN) 420(1) is formed on the chrome film 410(1) by additionally supplying nitrogen gas (N$_2$) to argon gas (Ar) within the chamber.

At this time, the chrome nitride film 420(1) may have the same or similar thickness to that of the chrome film 410(1).

When forming the chrome film 410(1), sputtering is performed in an argon atmosphere, and, when forming the chrome nitride film 420(1), sputtering is performed in a combined argon-nitrogen atmosphere.

Figure 6:
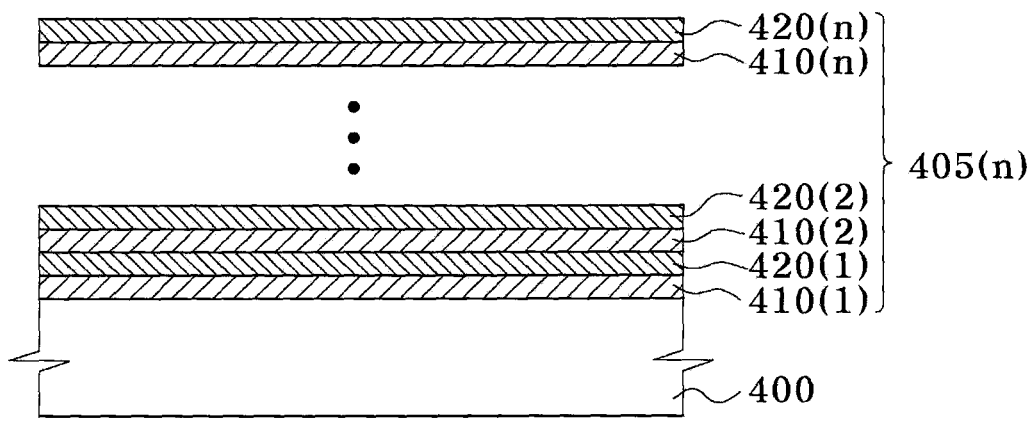

Next, as shown in FIG. 6, a chrome film 410(2) is formed on the chrome nitride film 420(1) by performing sputtering again in the argon atmosphere within the chamber, and a chrome nitride film 420(2) is formed on the chrome film 410(2) by performing sputtering again in the combined argon-nitrogen atmosphere. As such, the first coating layer 405(n) is formed by repeating the process of forming the chrome film/chrome nitride film (S330).

Referring to FIG. 6, the first coating layer 405(n) comprises a total of "n" chrome/chrome nitride films. Here, the number of chrome/chrome nitride films constituting the first coating layer $405(n)$ is 2~200, and preferably 5~100.

In this manner, the first coating layer $405(n)$ is formed by deposition of multiple chrome/chrome nitride films for the purpose of enhancing the corrosion resistance by suppressing formation of through-holes in the first coating layer $405(n)$.

Further, the reason for alternately depositing the chrome films and the chrome nitride films instead of forming the first coating layer $405(a)$ with a single chrome film 410 or a single chrome nitride film 420 is to prevent reduced corrosion resistance, which can occur when depositing only the chrome film 410, and to prevent reduced electrical conductivity, which can occur when depositing only the chrome nitride film 420.

In the first coating layer $405(n)$ formed as described above, a single chrome/chrome nitride film preferably has a thickness in the range of $\frac{1}{200}$~$\frac{1}{60}$ of the total thickness of the first coating layer $405(n)$.

Figure 7:
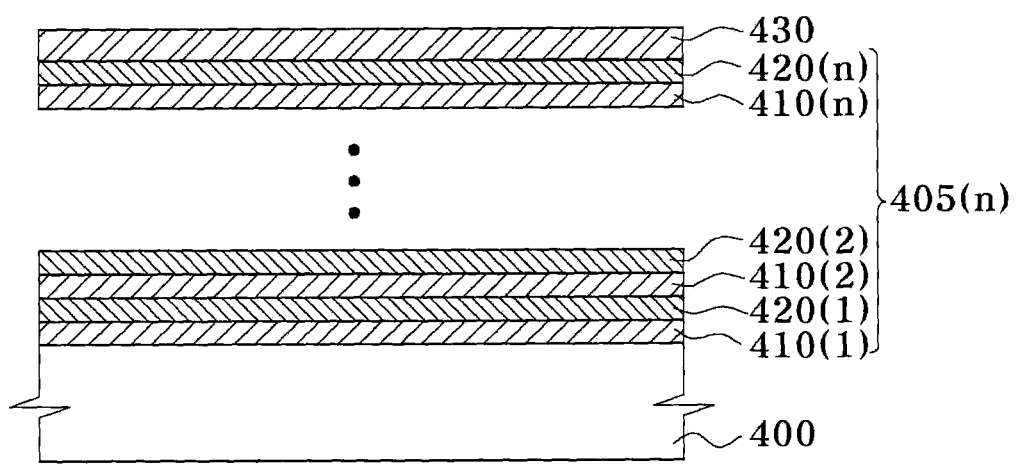

Last, as shown in FIG. 7, a second coating layer 430 is formed on the first coating layer $405(n)$ (S340).

The second coating layer 430 is a metal oxynitride film ($MO_yN_z$), and has a thickness greater than 0 to 100 nm or less, and preferably 10~100 nm ($0.05 \leq y \leq 2$, $0.25 \leq z \leq 1.0$).

The metal oxynitride film ($MO_yN_z$) may be formed by simultaneously supplying nitrogen ($N_2$) and oxygen ($O_2$) into the chamber for continuously performing sputtering after forming the first coating layer. Alternatively, the metal oxynitride film ($MO_yN_z$) may be formed by diffusion of oxygen instead of deposition. In other words, the metal oxynitride film ($MO_yN_z$) may be formed via thermal oxidation or plasma oxidation, by which the stainless steel sheet having the first coating layer 405 formed thereon is heat treated in an oxygen atmosphere to diffuse oxygen into the metal nitride film.

The thermal oxidation is preferably performed at 300~900° C.

Preferably, the metal oxynitride film ($MO_yN_z$) 430 is formed by continuous sputtering after forming the first coating layer in order to ensure an easy process and superior properties of the metal oxynitride film ($MO_yN_z$) 430.

In other words, when forming the metal oxynitride film ($MO_yN_z$) 430 by continuously performing the sputtering in the state wherein nitrogen and oxygen are supplied into the chamber after the first coating layer 405 is formed, a metal oxynitride film ($CrO_yN_z$) is formed to have an increasing oxygen concentration toward the surface of the first coating layer 405.

In this embodiment, when forming the first coating layers $450(1)$~$405(n)$ and the second coating layer 430, argon gas is employed. However, the present invention is not limited to this, and any inert gas, such as helium (He), neon (Ne), etc. can also be employed.

At this time, when the second coating layer has a thickness of 100 nm, the atomic ratio of [O/N] is 0.2~8 at a depth of 5~15 nm from the surface of the second coating layer, and the atomic ratio of [O/N] is preferably 0.5 or less at a depth of 45~55 nm from the surface thereof in view of good electrical conductivity.

The metal oxynitride film ($CrO_yN_z$) constituting the second coating layer 430 exhibits a superior corrosion resistance and a similar electrical conductivity to the metal nitride film 420. These properties of the metal oxynitride film ($CrO_yN_z$) can be obtained only when the metal oxynitride film ($CrO_yN_z$) has a thickness of 100 nm or less as described above. When the metal oxynitride film ($CrO_yN_z$) has a thickness exceeding 100 nm, the electrical conductivity of the metal oxynitride film falls below a desired value irrespective of good electrical conductivity thereof.

The stainless steel separator for fuel cells manufactured by the method of the invention described above has a contact resistance of 10 mΩ cm$^2$ or less and a corrosion current of 1 μA/cm$^2$ or less.

These values of the stainless steel separator satisfy standard levels suggested by the Department of Energy (DOE) wherein the contact resistance is set to 10 mΩ cm$^2$ or less and the corrosion current is set to 1 μA/cm$^2$ or less.

Hereinafter, a description will be given with reference to examples wherein the stainless steel separator for the fuel cell manufactured by the method according to the embodiments of the present invention has excellent electrical conductivity and corrosion resistance. Here, since other details not described herein can be sufficiently and technically achieved by those skilled in the art, a description thereof will be omitted herein.

1. EXAMPLES AND COMPARATIVE EXAMPLES

Examples

A matrix of 316 L stainless steel was coated using a chrome target and a PVD sputtering system available from J&L, Inc. under conditions as described below.

Table 1 shows coating conditions for respective Examples.

TABLE 1

| | Cr Coating Conditions | | CrN$_x$ Coating Conditions | | CrO$_y$N$_z$ Coating Conditions | | |
|---|---|---|---|---|---|---|---|
| No. | Ar flux (sccm) | time | Ar/N$_2$ flux (sccm) | time | N$_2$ flux (sccm) | O$_2$ flux (sccm) | time |
| Example 1 | 50 | 2 min. | 30/20 | 2 min. | 20 | 0 → 2 | 2 min. |
| Example 2 | 50 | 2 min. | 30/20 | 2 min. | 20 | 0 → 2 | 4 min. |
| Example 3 | 50 | 2 min. | 30/20 | 2 min. | 20 | 0 → 5 | 4 min. |
| Example 4 | 50 | 2 min. | 30/20 | 2 min. | 20 → 10 | 0 → 10 | 4 min. |
| Example 5 | 50 | 2 min. | 30/20 | 2 min. | 20 → 5 | 0 → 10 | 4 min. |

At a substrate temperature of 200° C. and a plasma power of 2.9 kW, an argon flux of 30 sccm was maintained when depositing $CrN_x/CrO_yN_z$, whereas a flux of oxygen or a flux of oxygen and nitrogen was varied at a predetermined rate as shown in Table 1 when depositing $CrO_yN_z$.

In each Example, a first coating layer was formed to a thickness of about 1 μm by sputtering 25 times while alternating between Cr/CrNx coating conditions. In Example 1, a second coating layer was formed to a thickness of about 50 nm, and in each of Examples 2 to 5, a second coating layer was formed to a thickness of about 100 nm.

Comparative Examples

A matrix of 316 L stainless steel was coated using a chrome target and a PVD sputtering system available from J&L, Inc. under condition as described below.

Table 2 shows coating conditions for respective Comparative Examples.

TABLE 2

| No. | Cr Coating Conditions | | $CrN_x$ Coating Conditions | | $CrO_yN_z$ Coating Conditions | | |
|---|---|---|---|---|---|---|---|
| | Ar flux (sccm) | time | $Ar/N_2$ flux (sccm) | time | $N_2$ flux (sccm) | $O_2$ flux (sccm) | time |
| Example 1 | 50 | 2 min. | 30/20 | 2 min. | 20 | 0 → 1 | 2 min. |
| Example 2 | 50 | 2 min. | 30/20 | 2 min. | 20 → 5 | 2 → 15 | 5 min. |

At a substrate temperature of 200 t and a plasma power of 2.9 kW, an argon flux of 30 sccm was maintained when depositing $CrN_x/CrO_yN_z$, whereas a flux of oxygen or a flux of oxygen and nitrogen was varied at a predetermined rate when depositing $CrO_yN_z$. In each Comparative Example, a first coating layer was formed to a thickness of about 1 µm by sputtering 25 times while alternating between Cr/CrNx coating conditions. In Comparative Example 1, a second coating layer was formed to a thickness of about 50 nm, and in Comparative Example 2, a second coating layer was formed to a thickness of about 120 nm.

2. Measurement of Properties (1) Measurement of compositional ratio depending on thickness of second coating layer by means of AES A compositional ratio of oxygen O to nitrogen N depending on the thickness of the second coating layer of each stainless steel separator manufactured using the aforementioned examples was measured by means of ESCALAB250 available from VG Scientific, Inc.

(2) Measurement of Contact Resistance (Electrical Conductivity)

Figure 8:
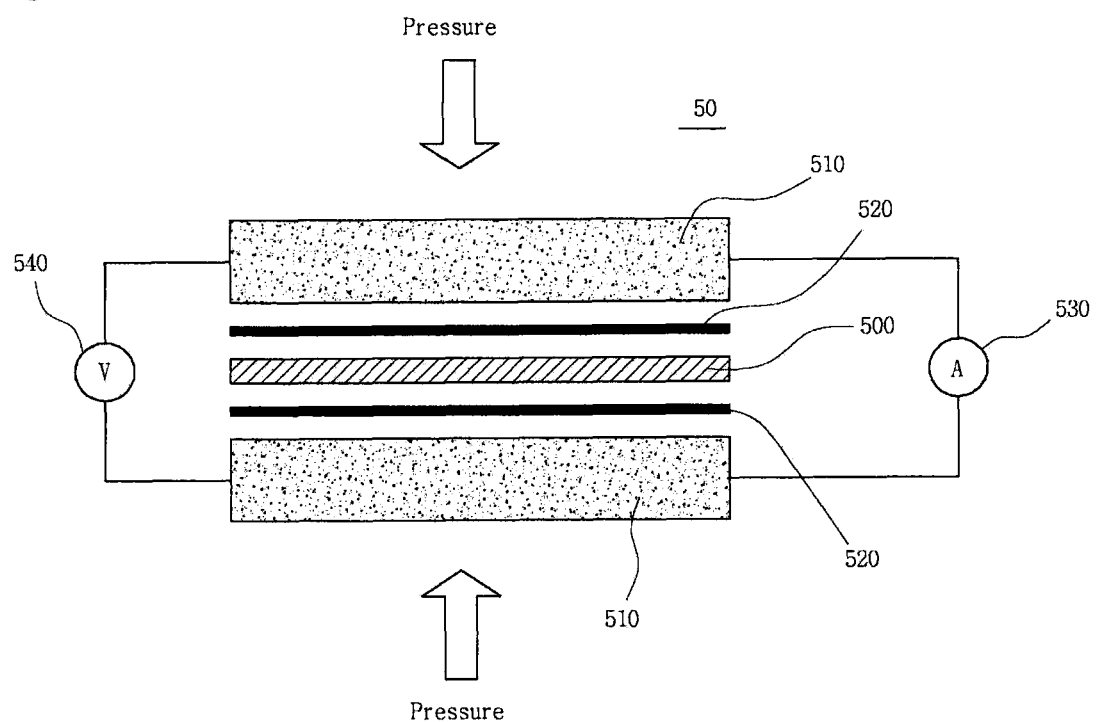
FIG. 8 is a cross-sectional view of a contact resistance tester for measuring contact resistance of a stainless steel separator according to the present invention.

FIG. 8 is a cross-sectional view of a contact resistance tester for measuring the contact resistance of a stainless steel separator according to the present invention.

Referring to FIG. 8, in order to obtain optimized parameters for cell assembly through measurement of contact resistance of a stainless steel sheet 500, a modified Davies method was used to measure contact resistance between stainless steel (SS) and two pieces of carbon paper.

The contact resistance was measured based on the principle of measuring four-wire current-voltage via a contact resistance tester (available from Zahner Inc., Model No. IM6).

Measurement of contact resistance was performed by application of DC 2 A and AC 0.2 A to a measuring target in a constant current mode at a frequency in the range of 10 kHz to 10 mHz.

The carbon paper was 10 BB available from SGL Inc.

In the contact resistance tester 50, a sample 500 was disposed between two pieces of carbon paper 520 and copper plates 510 connected to both a current supplier 530 and a voltage tester 540.

After positioning the sample 500, voltage was measured by applying DC 2 A/AC 0.2 A to the sample 500 using a current supplier 530 (available from Zahner Inc., Model No. IM6).

Then, the sample 500, carbon paper 520, and copper plates 510 were compressed to form a stacked structure from both copper plates 510 of the contact resistance tester 50 using a pressure regulator (Model No. 5566, available from Instron Inc., compression maintaining test). Using the pressure regulator, a pressure of 50~150 N/cm² was applied to the contact resistance tester 50.

Finally, the contact resistances of samples 500, that is, stainless steel sheets, of the inventive and comparative examples shown in Tables 1 and 2 were measured using the contact resistance tester 50 installed as described above.

(3) Measurement of Corrosion Current

Corrosion current of the stainless steel sheet according to the present invention was measured using EG&G Model No. 273A as a corrosion current tester. Tests for corrosion endurance were performed in a simulated environment of a polymer electrolyte fuel cell (PEFC).

After being dipped at 80° C. with 0.1N $H_2SO_4$+2 ppm HF as an etching solution, the stainless steel sheet samples according to the invention were subjected to $N_2$ bubbling for 1 hour, and, corrosion current thereof was measured at an open circuit voltage (OCV) of −0.25V~1V vs. SCE (Saturated Calomel Electrode).

Further, physical properties were measured at −0.24V vs. SCE for a PEFC anode environment and at 0.658V vs. SCE (0.9 vs. NHE) for a PEFC cathode environment.

Here, the measured properties were evaluated based on data of corrosion current at 0.658V vs. SCE (0.9 vs. NHE) in a cathode environment of a fuel cell environment.

The anode environment is an environment in which hydrogen is split into hydrogen ions and electrons while passing through a membrane electrode assembly (MEA), and the cathode environment is an environment in which oxygen combines with the hydrogen ions to produce water after passing through the MEA.

As described above, since the cathode environment has a high potential and is a very corrosive environment, the cathode environment is preferred to test the corrosion resistance.

Further, it is desirable that the stainless steel sheet have a corrosion current of 1 µA/cm² or less at 0.658V vs. SCE (0.9 vs. NHE), which satisfies the DOE standard.

3. Results and Analysis of Property Measurement

Figure 9:
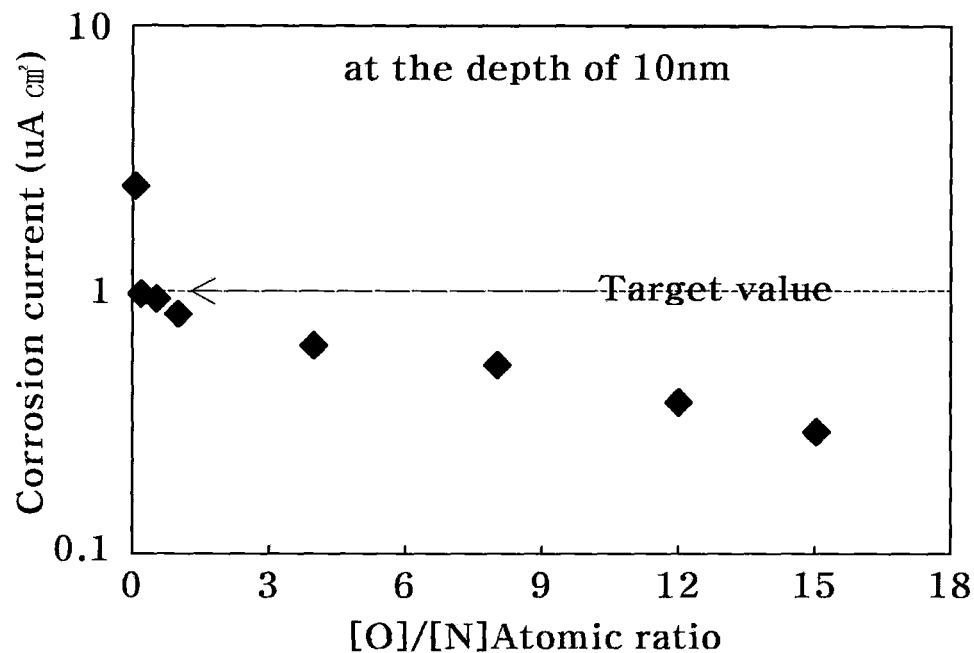
FIG. 9 is a graph depicting the relationship between corrosion current and atomic ratio of [O/N] at a depth of about 10 nm from a surface of a second coating layer for each stainless steel separator made using examples.

FIG. 9 is a graph depicting the relationship between corrosion current and atomic ratio of [O/N] at a depth of about 10 nm from the surface of a second coating layer for each stainless steel separator made using Examples and Comparative Examples. Here, a target value of the corrosion current was set to 1 µA/cm² which is the DOE standard.

Referring to FIG. 9, when the atomic ratio of [O/N] at the depth of about 10 nm from the surface of the second coating layer is about 0.2 or more, the corrosion current satisfactorily approaches the target value, whereas when the atomic ratio of [O/N] is less than 0.2, the corrosion current deviates from the target value.

Figure 10:
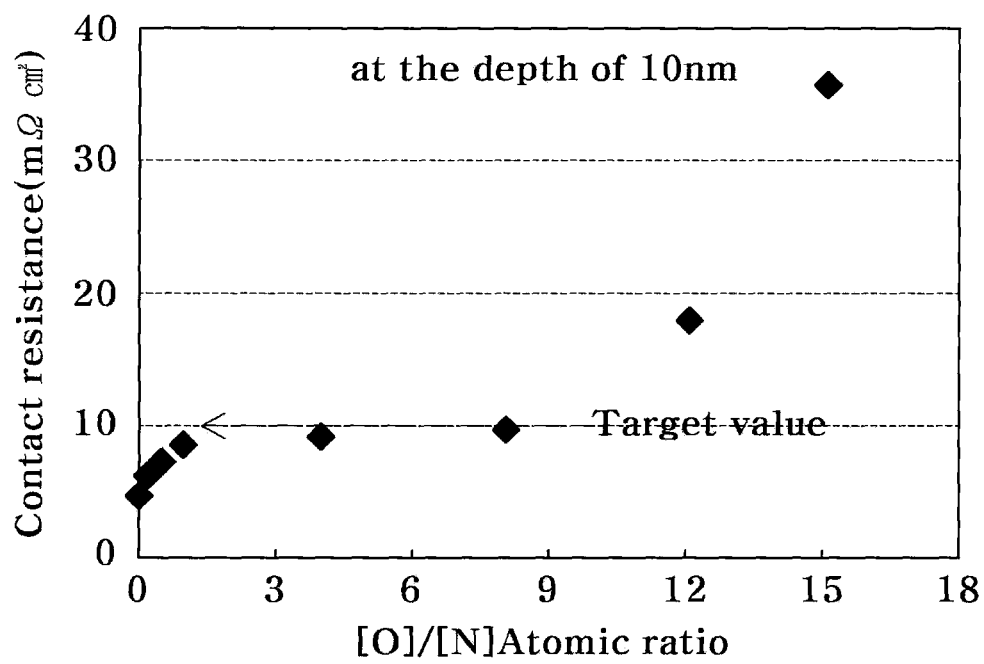
FIG. 10 is a graph depicting the relationship between contact resistance and atomic ratio of [O/N] at a depth of about 10 nm from a surface of a second coating layer for each stainless steel separator made using examples.

FIG. 10 is a graph depicting the relationship between contact resistance and atomic ratio of [O/N] at a depth of about 10 nm from the surface of a second coating layer of each stainless steel separator made using Examples and Comparative Examples. Here, a target value of the contact resistance was set to 10 mΩ cm$^2$ which is the DOE standard.

Referring to FIG. 10, when the atomic ratio of [O/N] at the depth of about 10 nm from the surface of the second coating layer is about 8 or less, the contact resistance satisfactorily approaches the target value, whereas when the atomic ratio of [O/N] exceeds 8, the contact resistance deviates from the target value.

Figure 11:
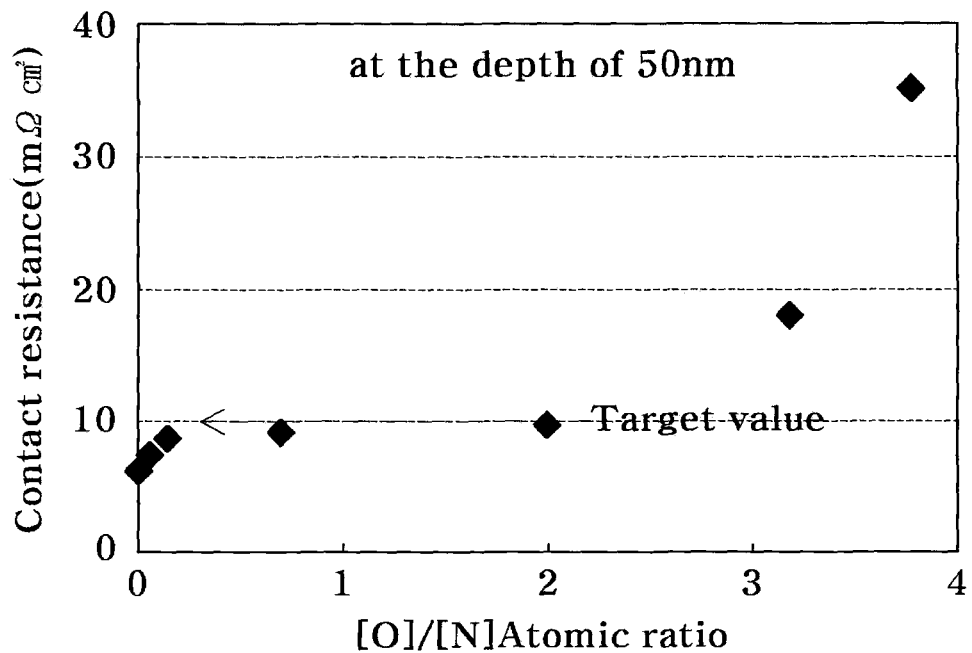
FIG. 11 is a graph depicting the relationship between contact resistance and atomic ratio of [O/N] at a depth of about 50 nm from a surface of a second coating layer for each stainless steel separator made using examples.

FIG. 11 is a graph depicting the relationship between contact resistance and atomic ratio of [O/N] at a depth of about 50 nm from the surface of a second coating layer for each stainless steel separator made using the examples. A target value of the contact resistance was also set to 10 mΩ cm$^2$ which is the DOE standard.

Referring to FIG. 11, when the atomic ratio of [O/N] at the depth of about 50 nm from the surface of the second coating layer is about 0.5 or less, the contact resistance satisfactorily approaches the target value. When the atomic ratio of [O/N] exceeds 0.5, the contact resistance deviates from the target value.

Figure 12:
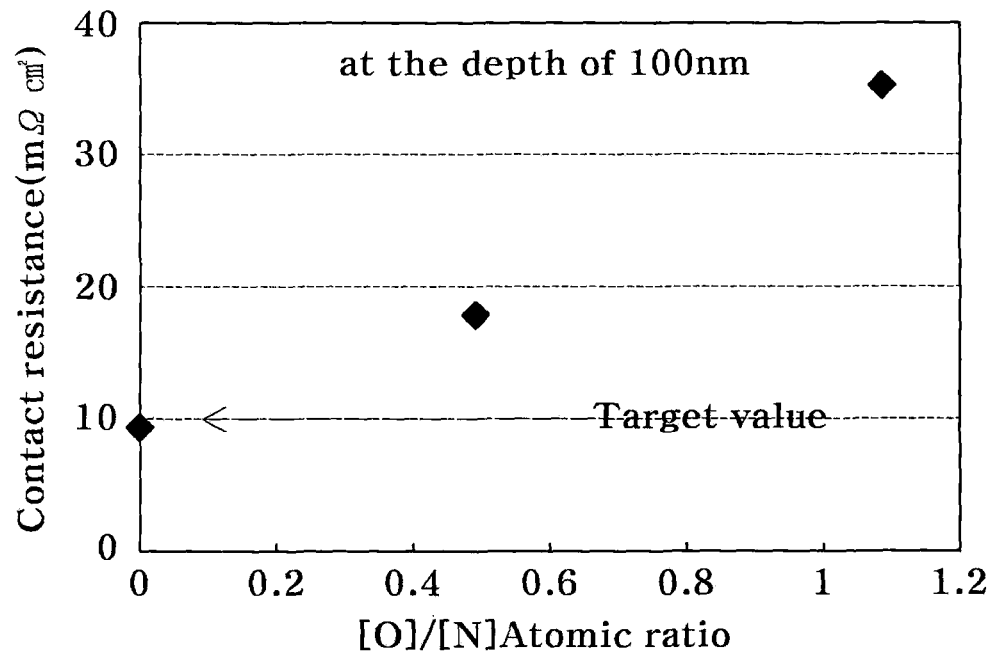
FIG. 12 is a graph depicting the relationship between contact resistance and atomic ratio of [O/N] at a depth of about 100 nm (near an interface between a first contact layer and a second contact layer) from a surface of the second coating layer for each stainless steel separator made using examples.

FIG. 12 is a graph depicting the relationship between contact resistance and atomic ratio of [O/N] at a depth of about 100 nm (near an interface between a first contact layer and a second contact layer) from the surface of the second coating layer for each stainless steel separator made using the examples.

Referring to FIG. 12, when the atomic ratio of [O/N] at the depth of about 100 nm exceeds 0, the contact resistance deviates from the target value.

In other words, it can be appreciated that it is advantageous in view of electrical conductivity to have no oxygen element at the depth of 100 nm from the surface of the second coating layer.

From these results, it can be appreciated that it is desirable for the second coating layer to have a thickness of 100 nm or less.

Figure 13:
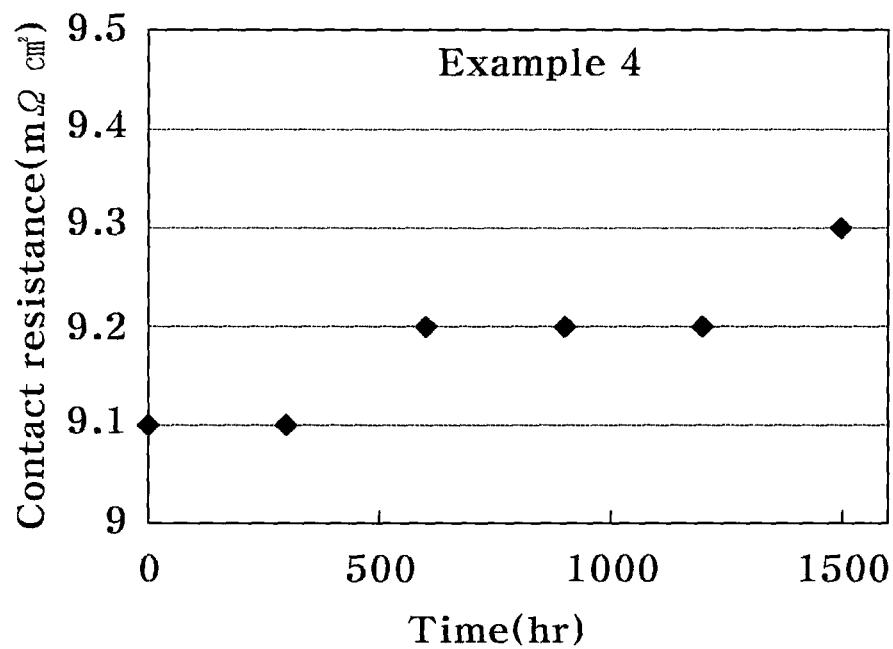
FIG. 13 is a graph depicting contact resistance of Example 4 over time in a simulated fuel cell environment.

FIG. 13 is a graph depicting contact resistance of Example 4 over time in a simulated fuel cell environment. After applying a potential of 0.658V vs. SCE (0.9V vs. NHE) to the stainless steel separator immersed into 0.1N $H_2SO_{4+2}$ ppm HF solution at 80° C. the corrosion current was measured at predetermined time intervals.

Referring to FIG. 13, although the contact resistance increased by about 2.2% from 9.1 mΩ cm$^2$ before immersion to about 9.3 mΩ cm$^2$ after 1500 hours, the contact resistance was less than the target value of 10 mΩ cm$^2$, showing the stainless steel separator of Example 4 had excellent properties after a long period of time.

Figure 14:
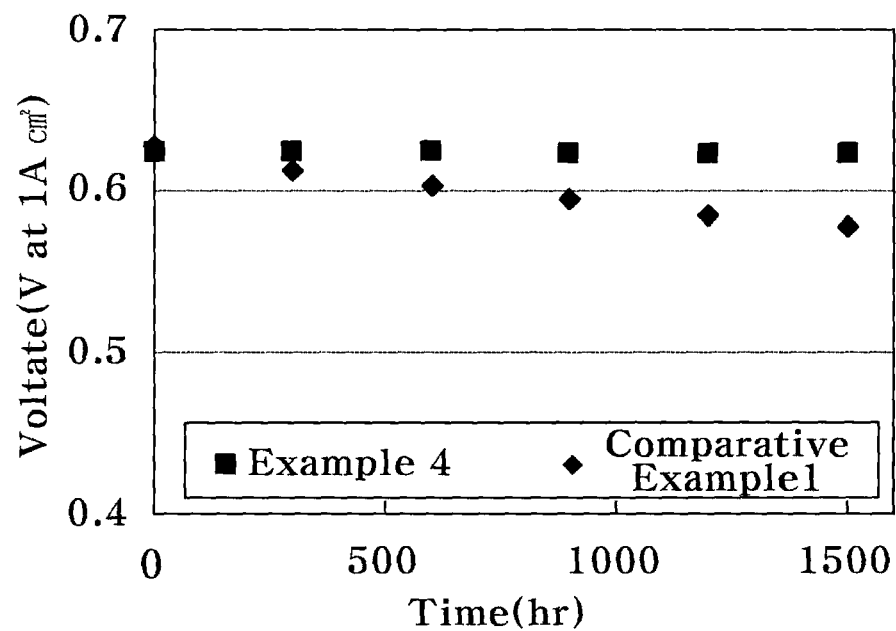
FIG. 14 is a graph depicting results of evaluating fuel cell performance of Example 4 and Comparative Example 1, in which voltage of fuel cells incorporating Example 4 and Comparative Example 1 was measured after application of constant current (1 A/cm$^2$) to the fuel cells.

FIG. 14 is a graph depicting results evaluating fuel cell performance of Example 4 and Comparative Example 1. In this graph, voltage of fuel cells incorporating Example 4 and Comparative Example 1 was measured after application of constant current (1 A/cm$^2$) to each fuel cell.

Referring to FIG. 14, both Example 4 and Comparative Example 1 initially exhibit a high voltage of 0.625V. However, Comparative Example 1 has a continuous voltage decrease down to 0.578V after 1500 hours, whereas Example 4 has a voltage of 0.623V even after 1500 hours, showing that excellent performance of the fuel cell incorporating the stainless steel separator of the invention continues for a long period of time.

The invention claimed is:

1. A stainless steel separator for a fuel cell comprising:
   a stainless steel sheet extending in one plane along one axis;
   a first coating layer composed of a plurality of metal/metal nitride films (M/MNx) ($0.5 \leq x \leq 1$) on a surface of the stainless steel sheet; and
   a second coating layer comprising a metal oxynitride film (MOyNz) ($0.05 \leq y \leq 2, 0.25 \leq z \leq 1.0$) formed on the first coating layer,
   wherein the metal oxynitride film of the second coating layer has an increasing oxygen concentration towards the surface of the first coating layer.

2. The stainless steel separator according to claim 1 further comprising:
   a passive film interposed between the surface of the stainless steel sheet and the first coating layer.

3. The stainless steel separator according to claim 1, wherein the metal/metal nitride films of the first coating layer comprises the metal film (M) contacting the stainless steel sheet and the metal nitride film (MN) contacting the second coating layer.

4. The stainless steel separator according to claim 1, wherein the metal (M) in the first coating layer and the second coating layer is selected from the group consisting of chrome (Cr), titanium (Ti), and zirconium (Zr).

5. The stainless steel separator according to claim 1, wherein the metal (M) in the first coating layer and the second coating layer is selected from the group consisting of transition metals.

6. The stainless steel separator according to claim 1, wherein the plurality of metal/metal nitride films comprise Cr/CrN films.

7. The stainless steel separator according to claim 6, wherein a number of the plurality of chrome/chrome nitride (Cr/CrN) films is 2-200.

8. The stainless steel separator according to claim 1, wherein the metal oxynitride film comprises CrOyNz ($0.05 \leq y \leq 2, 0.25 \leq z \leq 1.0$).

9. The stainless steel separator according to claim 1, wherein the second coating layer has a thickness of 10-100 nm.

10. The stainless steel separator according to claim 1, wherein when the second coating layer has a thickness of 100 nm, an atomic ratio of [O/N] at a depth of 5-15 nm from a surface of the second coating layer is 0.2-8.

11. The stainless steel separator according to claim 1, wherein when the second coating layer has a thickness of 100 nm, an atomic ratio of [O/N] at a depth of 45-55 nm from a surface of the second coating layer is 0.5 or less.

12. A method of manufacturing the stainless steel separator for the fuel cell according to claim 1 by sputtering, comprising:
   performing sputtering with a metal target in an argon atmosphere to form a metal film of a first coating layer;
   performing sputtering in a combined argon-nitrogen atmosphere to form a metal nitride film of the first coating layer (when forming the first coating layer comprising multiple metal/metal nitride films (M/MN), repeating the sputtering while alternating between the argon atmosphere and the combined argon-nitrogen atmosphere); and
   performing sputtering in a combined nitrogen-oxygen atmosphere to form a second coating layer comprising a metal oxynitride film (MOyNz) (0.05≦y≦2, 0.25≦z≦1.0) on the first coating layer.

13. The method according to claim 12, wherein the metal (M) in the first coating layer and the second coating layer is at least one selected from chrome (Cr), titanium (Ti), and zirconium (Zr).

14. The method according to claim 12 wherein the metal (M) in the first coating layer and the second coating layer is one selected from transition metals.

15. The method according to claim 12, wherein the sputtering is performed by a reactive sputtering process.

* * * * *